Figure 4:
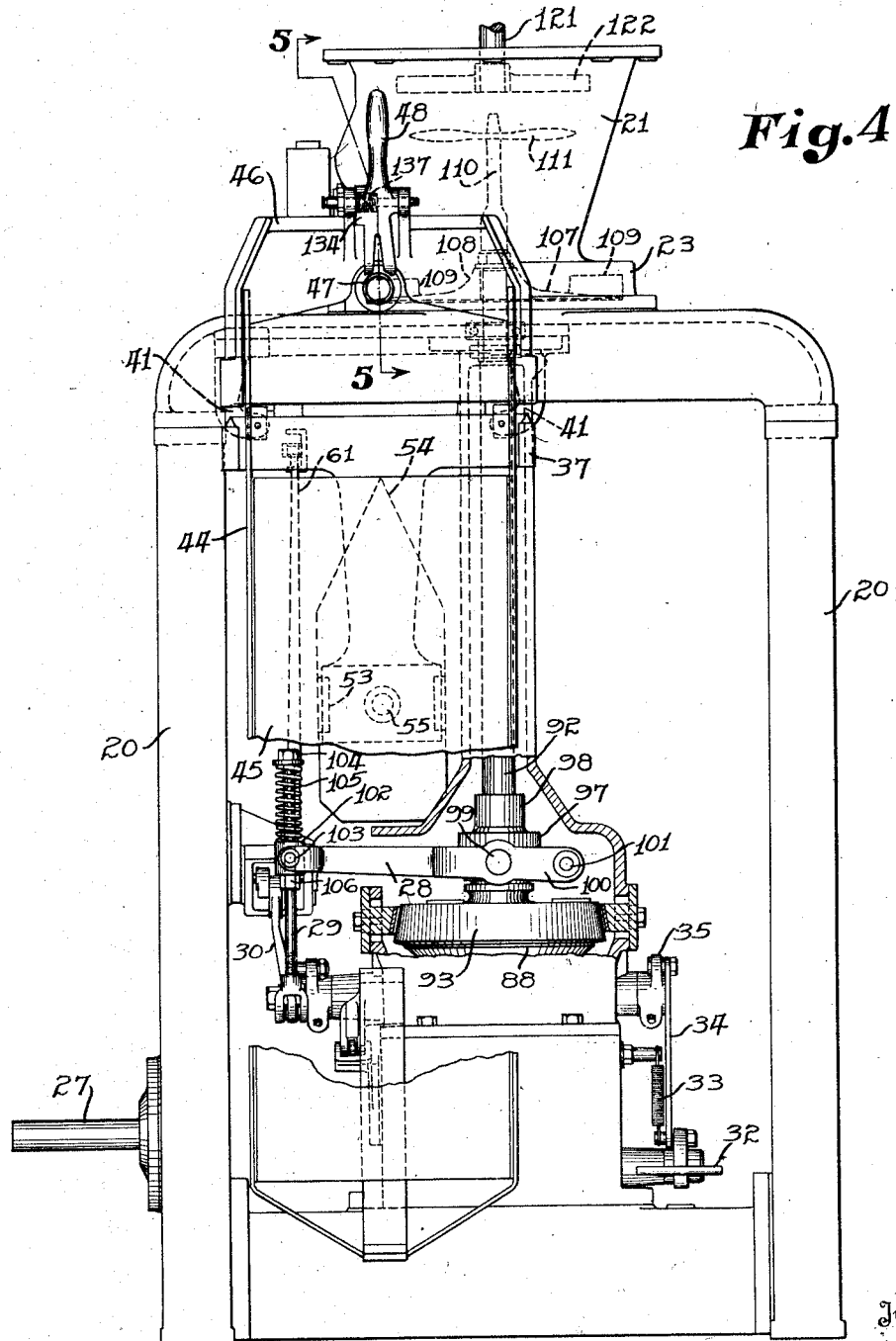

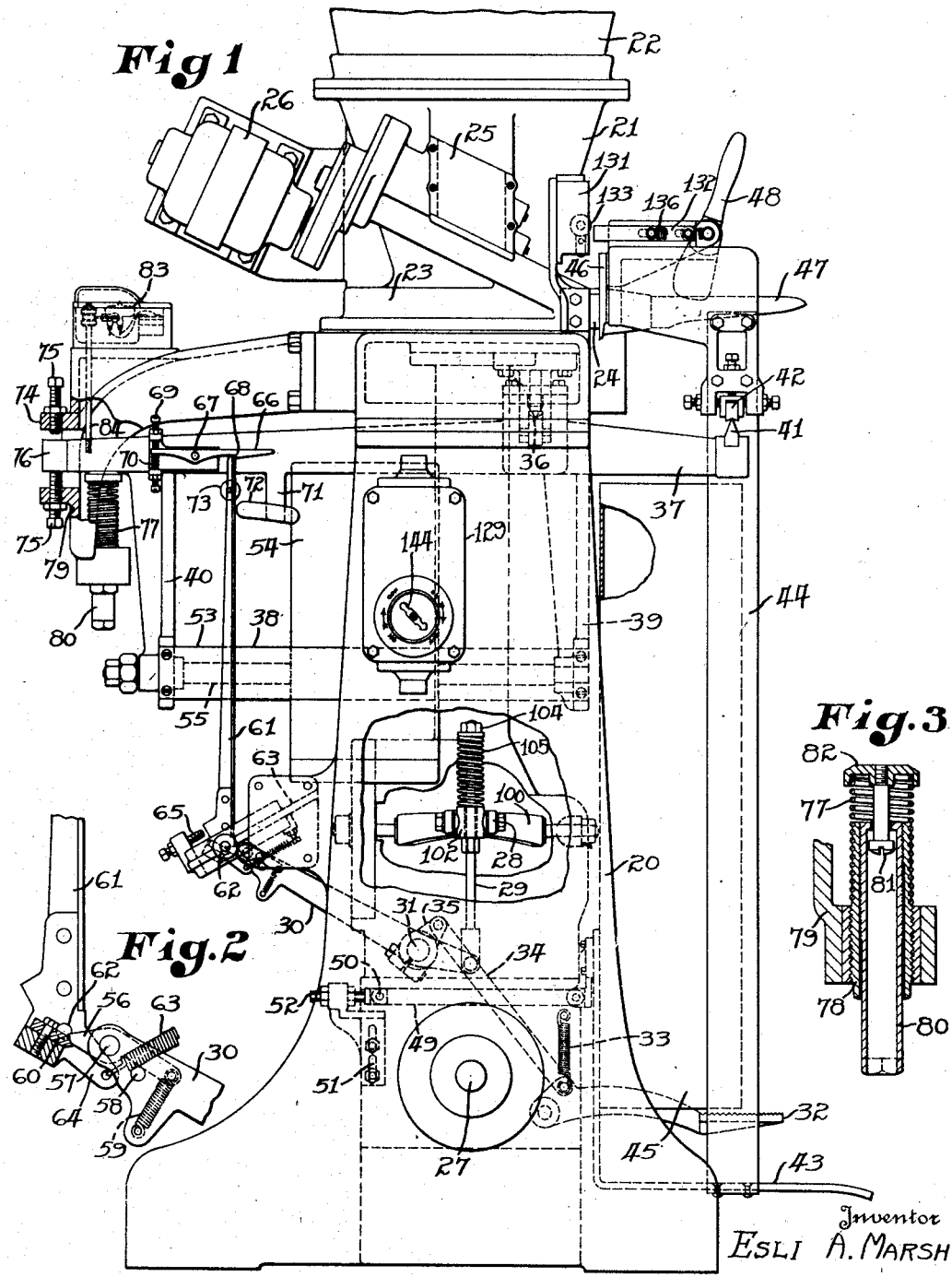

June 28, 1932. E. A. MARSH 1,864,545
APPARATUS FOR FILLING VALVE BAGS
Filed Dec. 26, 1928 5 Sheets-Sheet 2

Inventor
ESLI A. MARSH
By Owen & Owen
Attorneys

June 28, 1932.  E. A. MARSH  1,864,545
APPARATUS FOR FILLING VALVE BAGS
Filed Dec. 26, 1928  5 Sheets-Sheet 3
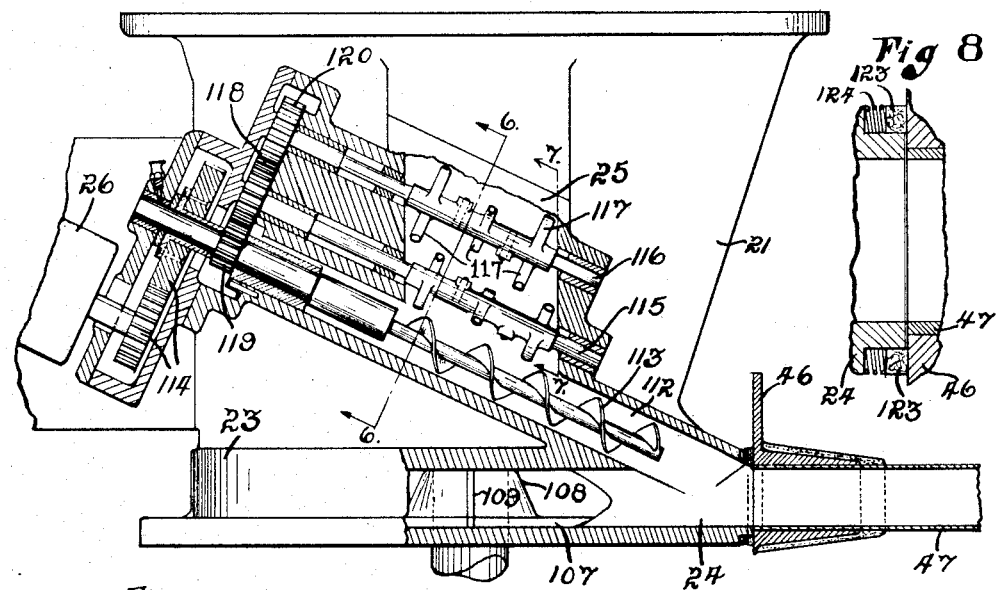
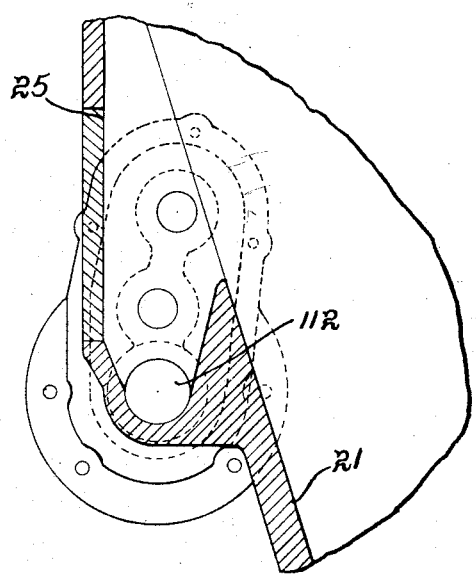
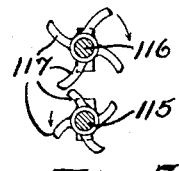
Inventor
Esli A. Marsh
By Owen & Owen
Attorneys

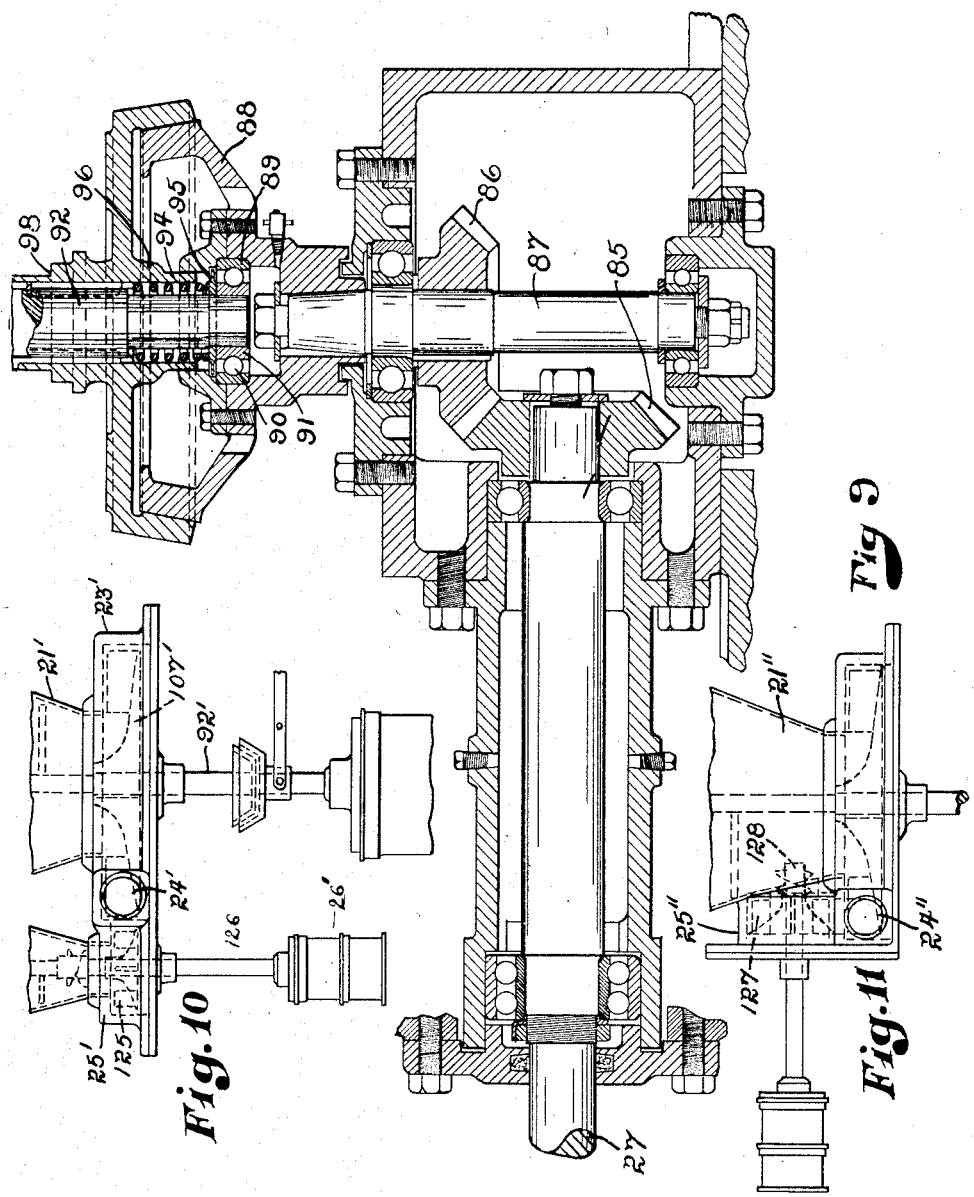

June 28, 1932.     E. A. MARSH     1,864,545
APPARATUS FOR FILLING VALVE BAGS
Filed Dec. 26, 1928     5 Sheets-Sheet 5
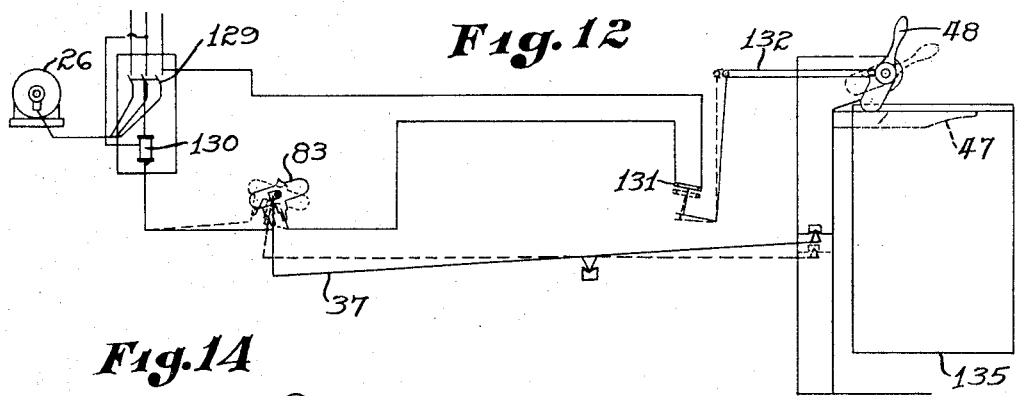
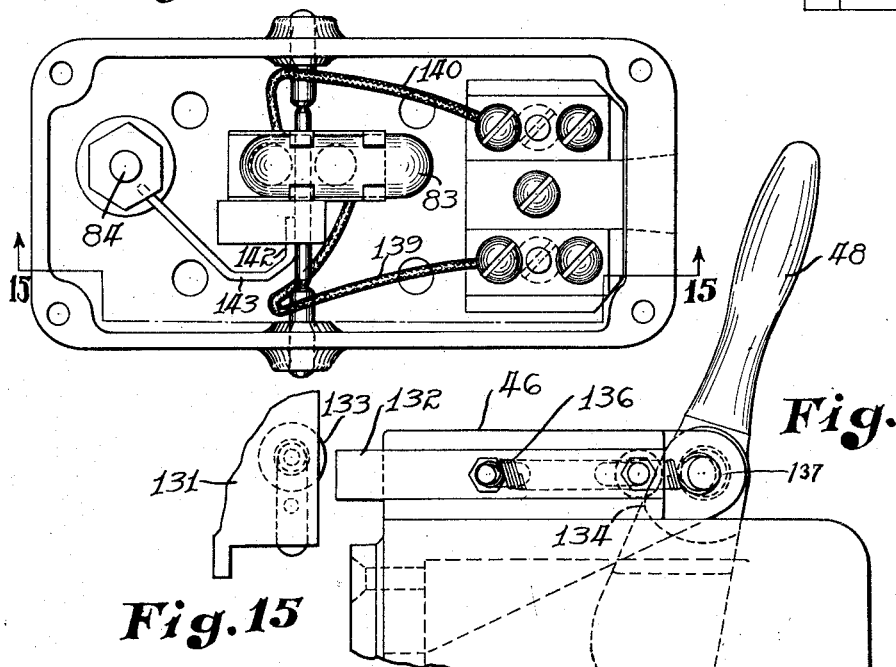
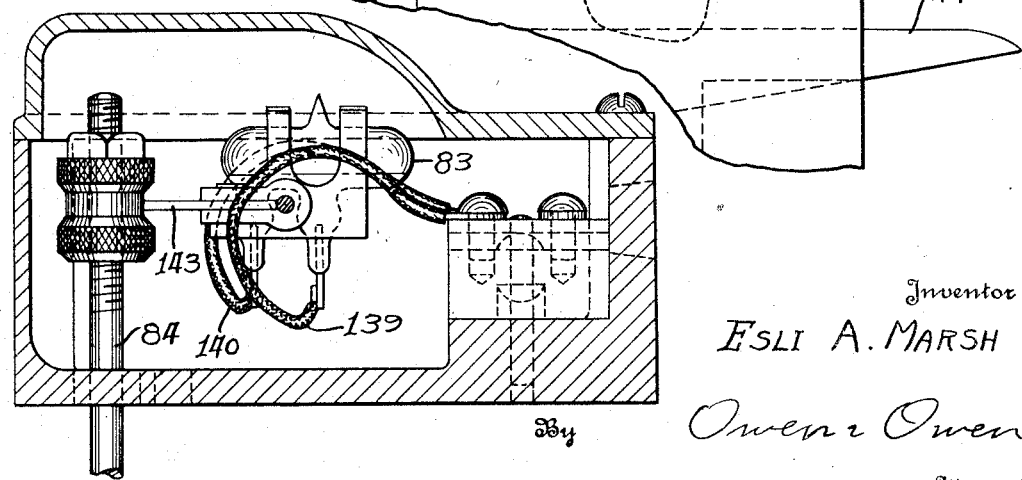
Inventor
ESLI A. MARSH
By Owen & Owen
Attorneys Patented June 28, 1932

1,864,545

UNITED STATES PATENT OFFICE

ESLI A. MARSH, OF OSWEGO, NEW YORK, ASSIGNOR, BY MESNE ASSIGNMENTS, TO ST. REGIS PAPER COMPANY, OF NEW YORK, N. Y., A CORPORATION OF NEW YORK

APPARATUS FOR FILLING VALVE BAGS

Application filed December 26, 1928. Serial No. 328,449.

This invention relates to apparatus for filling receptacles, and especially valve bags.

More particularly, it has to do with improved means for discharging material from a fixed receptacle to and through a filling spout mounted on a weighing device, with connections whereby the discharge is stopped by the action of the weighing device.

Specific features of the invention will appear as the description proceeds.

In the accompanying drawings forming a part of this specification, Fig. 1 is an elevation of apparatus embodying one form of the invention, parts being broken away for purposes of illustration; Figs. 2 and 3 are enlarged details of features indicated in Fig. 1; Fig. 4 is an elevation of apparatus shown in Fig. 1 viewed from the right of that figure, and with parts broken away; Fig. 5 is a partial section substantially on the line 5—5 of Fig. 4; Fig. 6 is a partial section substantially on the line 6—6 of Fig. 5, with the feed screw and agitators omitted; Fig. 7 is a partial section substantially on the line 7—7 of Fig. 5, showing the agitators; Fig. 8 is an enlarged detail showing the connection between the fixed spout and the movable spout; Fig. 9 is a section of the main drive connection and clutch; Figs. 10 and 11 are somewhat diagrammatic views showing alternative forms of auxiliary feeding devices; Fig. 12 is a diagram of the wiring for the auxiliary feed; Fig. 13 is an enlarged view of a safety switch; Fig. 14 is an enlarged plan view of the mercury switch; and Fig. 15 is a section substantially on the line 15—15 of Fig. 14.

The apparatus illustrated on the drawings comprises side members 20 upon which the working parts are supported. Above these members there is mounted a hopper 21, above which they may be a continuation of a storage reservoir 22, or any suitable means for guiding or feeding material into hopper 21.

The lower end of hopper 21 is expanded into a circular propeller chamber 23 having a horizontal discharge outlet 24. On the side of hopper 21 and above portion 23 there is a casing 25 in which there is feeding means driven by a motor 26 and adapted to receive material from hopper 21 and feed it into the upper side of discharge passage 24.

A horizontal shaft 27 near the bottom of the frame drives a vertical shaft which is connected by a clutch to a shaft driving a centrifugal propeller rotating on a vertical axis in portion 23 of the hopper, and adapted to discharge material through passage 24. The said clutch is controlled by a lever 28 connected by a link 29 to a lever 30 having limited oscillation on a rock shaft 31. A foot pedal 32 normally raised by a spring 33 is connected by a link 34 with an arm 35 on shaft 31, so that depression of the pedal acts through the rock shaft 31, lever 30, link 29 and lever 28, to close the clutch and start the operation of the centrifugal propeller. A latch, which will be described later, keeps lever 30 in clutch-closing position after it has been moved to that position until the latch is released. The lost motion between rock shaft 31 and lever 30 allows spring 33 to raise pedal 32, when released, without affecting lever 30.

A weighing device of the pendulum type is pivoted on knife edge 36 supported on the frame. The weighing device comprises an upper member 37 and a lower member 38 connected to the upper member by brackets 39 and 40. The right end of member 37, as viewed in Fig. 1, is provided with knife edges 41 on which rest V-blocks 42 supporting a bag carrier. The carrier comprises a bottom 43, sides 44 and back 45, the top of the sides being connected by a bracket 46 which carries a spout 47 adapted to register with discharge passage 24 and to enter the valve of a bag that is to be filled. Bracket 46 carries a clamp 48 adapted to secure a bag in position on spout 47.

The lower end of the carrier is connected by a link 49 to a pivot 50 mounted adjustably on the frame. Link 49 is equal in length to the load-carrying arm constituted by the portion of member 37 between pivots 36 and 41, and pivot 50 is adjusted vertically by means of bolt and slot connection 51, so that the link is parallel with the arm, and is adjusted horizontally by screw 52 so as to bring spout 47 into proper relation to the discharge end of passage 24.

Lower member 38 of the weighing device comprises side pieces 53 between which there slides a weight 54 threaded on a screw 55 by means of which it may be adjusted. The weight is adjustable parallel with the direction of the load-carrying portion of member 37.

At the end of lever 30 opposite to link 29 there is a projecting member 56 pivoted at 57 to the lever and having the upward movement of its outer end limited by a stop 58 encountered by its inner end. A spring 59 normally holds the said inner end down against the stop.

When the apparatus is in filling position, the outer end of members 56 rests on a wear block 60 mounted on the lower end of a trigger 61 pivoted to the frame at 62. A spring 63 having one end connected to the frame and the other end connected to a downwardly projecting arm 64 on trigger 61 tends to throw the upper end of the trigger to the left until its movement is limited by a stop screw 65 mounted on the frame; but when member 56 rests on wear block 60, its downward pressure overcomes spring 63 and tends to swing the upper end of the trigger to the right.

A latch 66 pivoted at 67 on member 37 of the weighing device has a notch 68 which engages the upper end of trigger 61 and restrains its movement until the bag is properly filled. The upward movement of the left end of latch 66 is stopped by screw 69, against which it is held normally by a spring 70. A lug 71 attached to member 37 has a surface 72 in position to contact a roller 73 on trigger 61 when downward movement of a bag raises pivot 67 and latch 66 so as to release trigger 61 and allow it to swing under the influence of member 56.

Lugs 74 suitably mounted on the frame are provided with stop screws 75, between which there is located an extension 76 of member 37, whereby the swing of the weighing device is limited.

Mounted on the frame beneath member 37 adjacent to the stop screws there is a spring 77. Preferably, this spring is mounted as shown in Fig. 3. A sleeve 78 is screwed into a bracket 79 on the frame, and its upper end is grooved to receive the spring snugly. Within sleeve 78 there is screwed a hollow member 80 having a hole in its upper end, through which there works a screw 81 attached to a stop plate 82. By this mounting the effective length of the spring can be adjusted as well as the upper limit of its movement.

Above the left end of member 37 there is mounted a switch 83 controlling the circuit to motor 26 and opening that circuit when the switch is actuated by a plunger 84 raised by member 37 when it moves in response to the weight of a bag.

Shaft 27 is driven constantly during the operation of the apparatus, and carries on its end a bevel gear 85 in mesh with a gear 86 on a vertical stub shaft 87. See Fig. 10. Rigidly affixed on the upper end of shaft 87 is one member 88 of a clutch. The central portion of member 88 carries a bearing ring 89 grooved for balls 90. Within the balls there runs a grooved member 91 attached to the lower end of a shaft 92.

Splined upon shaft 92 is the upper member 93 of the clutch. A spring 94 rests upon a flange 95 on the upper edge of bearing member 91 and fits around the lower end of shaft 92 within a hollow boss 96 on member 93, and normally raises member 93 out of driving relation with member 88.

A collar 97 on a hollow boss 98 extending upward from member 93 around shaft 92, has outwardly projecting pins 99 passing through forked end 100 of lever 28 between link 29 and the fulcrum 101 of the lever. See Fig. 4. Link 29 passes through a block 102 pivoted at 103 to lever 29. A nut 104 on the end of link 29 confines a spring 105 against block 102, and so exerts yielding downward pressure on the lever when the link is lowered by pedal 32 and the connections previously described. A nut 106 or link 29 beneath block 102 limits the upward movement of the link through the block.

The upper end of shaft 92 is in driving relation with a propeller in portion 23 of the housing, the propeller comprising a disc 107 curving upward at the middle to form a hub 108, and having around its periphery a series of propeller blades 109, which fit with but little play within the outer part of portion 23 of the hopper, which may be called the propeller chamber. The blades are substantially the same height as discharge passage 24, and are in horizontal alignment therewith.

Extending upward above propeller hub 108, there is an extension 110 carrying blades 111 for agitating the material in the hopper and insuring its downward flow into the propeller chamber. Blades 111 may be formed similarly to propeller blades on an airplane, and directed so as to urge the material downward in the manner of a screw propeller.

In the bottom of auxiliary feeder casing 25 there is a passage 112 slanting downward into discharge passage 24 and of substantially the same size. In the construction shown in Fig. 5 a screw 113 is provided in this passage, and is driven from motor 26 by means of gearing 114. Above screw 113 there are two agitator shafts 115 and 116 having agitating arms 117. Lower agitator shaft 115 is driven in the opposite direction from the screw by a gear 118 meshing with a gear 119 on the screw shaft. Gear 118 meshes with gear 120 on the upper agitator shaft 116, so that the upper shaft is turned in the same direction as the screw shaft.

If found necessary or desirable, a shaft 121 may be provided above hopper 21 and may be driven from any suitable source of power and aid in feeding material to the hopper or keeping it from clogging therein, agitator arms 122 or other suitable devices being mounted on the shaft.

It is desirable to have member 46 move vertically with the least practicable friction between it and fixed discharge spout 24. At the same time, it is undesirable to allow the escape of dust between these members. In the construction shown in detail in Fig. 8, there is sufficient play between the metallic portions of members 46 and 24 to avoid friction between them, while a washer 123 of felt or similar material surrounds the joint and is pressed against member 46 by a light spring 124. The felt effectually prevents the escape of dust while yielding so readily that it interferes very little with the vertical movement of member 46.

Instead of the auxiliary feeding means shown in Fig. 5, other devices may be used, such, for example, as those shown in Figs. 10 and 11.

In Fig. 10 there is shown diagrammatically a portion of a hopper 21', propeller casing 23' and propeller 107' driven by shaft 92' and adapted to discharge material through passage 24', these parts being similar to those designated on Figs. 1 and 4 by similar numerals with the prime omitted.

Beside casing 23' there is a casing 25', in which there runs a propeller 125 similar to propeller 107', only smaller in horizontal cross section, and adapted to discharge material through passage 24'. Propeller 125 is driven by shaft 126 from motor 26', which may be controlled similarly to motor 26.

Fig. 11 shows a construction similar to that of Fig. 10, except that instead of having a casing 25' for an auxiliary propeller beside of casing 23', the auxiliary casing 25'' is above the discharge spout 24'' and is provided with an auxiliary propeller 127 rotating on a horizontal axis. A screw member 128 may be extended from propeller 127 into hopper 21'' and draw material therefrom into the auxiliary hopper.

While propeller 125 or 127 is preferably of smaller diameter than the main propeller associated therewith, it is preferable to make the axial width of the auxiliary propeller substantially equal the width of the discharge spout, the same as with the main propeller.

Fig. 12 is a wiring diagram for motor 26. The motor switch 129 is controlled by a magnet 130. Interposed in the magnet circuit there is switch 83 and a switch 131 operated by a member 132 connected to clamp 48. When both switches 83 and 131 are closed the magnet is energized to close switch 129.

Switch 131 is normally closed, but is opened by member 132 sliding against actuating roller 133 of the switch. A cam lug 134 on handle 48 forces slide 132 against roller 133 and opens the switch when the handle is moved to its dotted line position in Fig. 12. When handle 48 is moved to its full line position in that figure to clamp a bag 135 onto spout 47 spring 136 retracts slide 132 and allows switch 131 to close. Handle 48 is maintained against unintentional movement from the position in which it is placed by a spring 137, which causes sufficient frictional contact between the handle and the mounting to effect this purpose.

Switch 83 may be constructed as shown in detail in Figs. 14 and 15. A mercury switch 83 is mounted on pivots 138. The circuit of magnet 130 is through leads 139 and 140 connected to the mercury switch. The switch is provided with balancing block 141 into which there is inserted the hooked end 142 of a resilient wire 143, the other end of which is rigidly secured to the upper end of rod 84. It will be seen that when rod 84 is raised the switch is rocked on its pivots to the dotted line position shown on Fig. 12, thereby uncovering the contact attached to lead 140 and breaking the circuit through the mercury.

A hand controlled switch 144 is provided for stopping motor 26 when it is to be shut down for a considerable period, and for use if the mercury switch should fail at any time to function as desired.

The operation of the apparatus will be fairly apparent from the foregoing description, but may be summarized as follows.

A suitable bag is positioned with spout 47 entering the valve, and clamp 48 is moved to the position in which it clamps the bag onto the spout. This movement of clamp 48 allows switch 131 to close. Since the right end of member 37 is in its up position at this time, switch 83 is closed, and the closing of switch 131 completes the magnet circuit, closes switch 129 and starts motor 26.

At substantially the same time the operator steps on treadle 32, and by the connections previously described, closes the clutch connecting constantly running drive shaft 27 with the shaft of the main propeller. Thus both propellers operate to force material through spout 47 into the bag.

Ordinarily the weighing device is adjusted so that it remains stationary during the filling of the greater portion of the charge into the bag. When the weight in the bag passes a predetermined limit, the forward end of member 37 begins to descend and its rear end to rise, thereby swinging weight 54 upward and laterally away from fulcrum point 36. This rapidly increases the counterbalancing effect of the weight, so that its continued movement is dependent upon the continued increase of weight in the bag, and the rate of its movement is roughly proportional to the rate of increase in weight.

Spring 77 assists in starting the upward movement of weight 54, but as the spring expands its lifting force decreases, so that the rate of swing of the weight is decreased from what it would be without the spring. The parts are preferably adjusted so that the spring reaches the limit of its expansion allowed by plate 82 at substantially the time that latch 66 is lifted clear of trigger 61.

When the swing of weight 54 reaches the point where trigger 61 is released, the left end of lever 30, as viewed in Fig. 1, swings downward and link 29 is raised. Spring 105, compressed to exert closing force in the clutch, expands and hastens the upward movement of link 29. Normally spring 94 raises clutch member 93 as soon as the resistance of spring 105 is released. If the clutch should stick for any reason, the momentum of the parts drives nut 106 against block 102 with sufficient force to jar clutch member 93 loose, and under any circumstances this blow of nut 106 insures the prompt and complete release of the clutch at the instant it is delivered. In this way the opening of the clutch and the stopping of the main propeller is timed accurately.

After the main propeller is stopped, the auxiliary feeder continues to force material into the bag until weight 54 is swung far enough to open switch 83 and stop motor 26.

While the varying effective force of weight 54 tends to prevent its being swung farther than the position justified by the weight of material in the bag, the momentum of the parts is sometimes such as to continue the motion of the weighing device, after the main feed is stopped, to a point beyond that justified by the weight of the material in the bag, after which it is retarded until it is less far than it should be, thus continuing to oscillate above and below the exact weight point. Under such circumstances, switch 83 may be opened on an excess swing, then closed on the return movement, and thus be opened and closed several times before remaining open, the open periods becoming successively longer.

The cessation of the lifting force of spring 77 at substantially the time the main feeding device is stopped tends to dampen the swing of the weighing device; but where roller 73 is provided to run over surface 72 when trigger 61 is tripped, the swing of the weighing device is stopped positively. This stop may be employed, or omitted, as preferred.

When the permanent opening of switch 83 indicates the completion of the filling of the bag, clamp 48 is released and the bag removed. Thereafter, weight 54 swings back to its original position, closing switch 83; but since the movement of clamp 48 resulted in the opening of switch 131, motor 26 is not started until another bag is put on the feed spout and clamped in position in the manner described above.

While one embodiment of the invention has been described with considerable detail, and some alternative types of auxiliary feed have been indicated, it will be understood that other devices may be used for producing two rates of feed through the feed spout, and other obvious changes may be made within the scope of the appended claims.

The particular weighing device and the means for controlling motor 26 from the bag clamp are not parts of this invention and are not claimed herein. It will be understood that the essential features of the tripping and stopping devices will work similarly with other types of weighing devices.

What is claimed is:

1. In apparatus for filling valve bags, a substantially horizontal spout adapted to enter the valve of a bag, weighing means adapted to support a bag being filled through said spout, main feeding means adapted to propel material at high speed through said spout, auxiliary means adapted to propel material at a relatively low speed through said spout, and means controlled by the weighing means for cutting off the main feeding means when the bag is nearly full and the auxiliary feeding means when the bag has received a full charge.

2. In apparatus for filling valve bags a substantially horizontal spout adapted to enter the valve of a bag, weighing means adapted to support a bag being filled through said spout, main feeding means adapted to propel material at high speed through said spout, auxiliary means adapted to propel material at a relatively low speed through said spout, and means governed by said weighing means for stopping the action of the main feeding means after the major portion of the desired charge has been forced through said spout and for stopping the action of the auxiliary feeding means when the desired charge is completed.

3. In apparatus for filling valve bags, a spout adapted to enter the valve of a bag, a weighing device adapted to support the spout and a bag being filled through the spout, a main feeding device having an inlet of greater cross section than said spout and adapted to discharge material at high speed through said spout, and an auxiliary feeding device adapted to discharge material at a relatively low speed through said spout.

4. In apparatus of the character described, weighing means adapted to support a receptacle and to permit the receptacle to move through a predetermined path in response to predetermined increases in the material in the receptacle, feeding means adapted to feed material into the receptacle at two different rates, means controlled by the movement of the receptacle and weighing means and operative to suddenly shut off the faster rate of feed when the receptacle reaches a predetermined point in its movement in response to increased weight, and means to positively, but momentarily, stop the receptacle at said point in its movement and before it moves farther in response to the added charge furnished by the slower rate of feed.

5. In apparatus for filling receptacles, weighing means adapted to support a receptacle and comprising a spout mounted on the weighing means, a main feeding means adapted to discharge material through the spout into a receptacle, auxiliary feeding means adapted to discharge material through the spout into the receptacle, means controlled by the movement of the weighing means to stop the main feeding means, means to halt the movement of the weighing means when the main feeding means is stopped, and means controlled by the movement of the weighing means to stop the auxiliary feeding means.

6. In apparatus for filling receptacles, a weighing means adapted to support a receptacle to be filled and comprising a spout supported upon the weighing means and adapted to discharge into a receptacle thereon, a main feeding propeller adapted to drive material through the spout into the receptacle, an auxiliary feeding device adapted to drive material through the spout into the receptacle, stopping means for the main feeding propeller comprising a trigger in position to be tripped by movement of the weighing means, a member movable with the weighing means and provided with a stop surface, a member on the trigger cooperating with the stop surface when the trigger is tripped to halt the movement of the weighing means, and means controlled by the movement of the weighing means for stopping the auxiliary feeding means.

7. Apparatus for filling receptacles comprising a weighing device adapted to support a receptacle, feeding means adapted to fill material into a receptacle on said device, a shaft driving said feeding means, a clutch for connecting the shaft with a source of power, a spring normally opening the clutch, clutch-closing means comprising a spring and means for compressing the spring to overcome the action of the clutch-opening spring, a latch holding the clutch closed until released by movement of the weighing device and means moved by the expansion of the clutch-closing spring and adapted by the momentum thus imparted to deliver a clutch-opening blow.

8. Apparatus for filling receptacles, comprising a weighing means adapted to support a receptacle, a main feeding means of the centrifugal type having a tangential passage through which material is driven into a receptacle on said weighing means, and auxiliary feeding means adapted to feed material at a lesser rate than said centrifugal feeder into the same discharge passage.

9. Apparatus for filling receptacles, comprising a weighing means adapted to support a receptacle, a main feeding means of the centrifugal type having a tangential passage through which material is driven into a receptacle on said weighing means, and auxiliary feeding means adapted to feed material at a lesser rate than said centrifugal feeder into the same discharge passage, the said auxiliary feeding means being arranged to drive material into said passage from a plane at one side of the passage axially of the centrifugal feeding means.

10. Apparatus for feeding receptacles comprising a weighing device adapted to support a receptacle to be filled, a casing provided with a discharge passage adapted to feed material into a receptacle on the weighing device, a main feeding propeller adapted to discharge into said passage and an auxiliary feeding device adapted to discharge into said passage, each of said devices being adapted to force material into said passage in a stream having a width substantially equalling that of the passage.

11. Apparatus for filling receptacles, comprising a weighing device adapted to support a receptacle to be filled, a casing having a discharge passage adapted to discharge material into a receptacle on said device, a centrifugal propeller adapted to force material into and through said passage, and a feed screw adapted to force material into said passage.

12. Apparatus for filling receptacles, comprising a weighing device adapted to support a receptacle to be filled, a casing having a discharge pipe adapted to discharge material into a receptacle on said device, a centrifugal propeller adapted to force material into and through said passage, and a feed screw adapted to force material into said passage, said screw having a diameter substantially equal to that of said passage.

13. Apparatus for filling receptacles, comprising a weighing device adapted to support a receptacle to be filled, a substantially cylindrical casing having a vertical axis and a tangential feed opening adapted to feed material into a receptacle on said weighing device, a centrifugal propeller mounted in said casing, a shroud over the outer portion of the upper side of said propeller, a hopper adapted to feed material into the central portion of said propeller, an auxiliary feeding device mounted above said shroud and adapted to feed material downward into said discharge passage, and an opening into the hopper to said auxiliary feeding device.

14. Apparatus for filling valve bags, comprising a weighing device, a spout mounted on the weighing device and adapted to enter the valve of a bag, a fixed hopper having a discharge passage with which said spout is adapted to register, a main feeding means adapted to feed material from the hopper into the spout, an auxiliary feeding means adapted to feed material into the spout, means controlled by the weighing device adapted to stop the main feeding means before the bag has received the entire charge desired and means controlled by the weighing device for stopping the auxiliary feeding means when the bag has received its full charge.

15. Apparatus for filling valve bags, comprising a weighing device, a spout supported upon the weighing device and adapted to enter the valve of a bag, a casing having a discharge passage with which said spout is adapted to register, a main propeller adapted to feed material through the passage into the spout, a clutch connecting the main propeller with a source of power, a pedal for closing the clutch, a latch holding the clutch closed until tripped by movement of the weighing device, an auxiliary propeller adapted to feed material into said passage, an electric motor driving said auxiliary propeller, a switch controlling the motor, and means actuated by the weighing device for operating said switch to stop the motor.

16. In apparatus for filling receptacles, a weighing device adapted to hold a receptacle, a spout mounted upon the weighing device and adapted to discharge into a receptacle thereon, feeding means having a discharge orifice with which the spout is adapted to be positioned in receiving relation and with respect to which it moves with the movement of the weighing device, there being a slight clearance between the spout and the wall of the feeding means around said discharge orifice, and a felt washer closing the joint between the discharge means and the spout.

17. Apparatus for filling receptacles comprising a weighing device, a spout supported on the weighing device and adapted to discharge into a receptacle thereon, a container having a fixed discharge pipe adapted to register with said spout, a plate surrounding the end of the spout next to said pipe, there being a slight clearance between the plate and pipe and a felt washer on said pipe bridging the space between it and the plate.

18. Apparatus for filling receptacles, comprising a weighing device, a spout supported on the weighing device and adapted to discharge into a receptacle thereon, a container having a fixed discharge pipe adapted to register with said spout, a plate surrounding the end of the spout next to said pipe, there being a slight clearance between the plate and pipe and a felt washer on said pipe bridging the space between it and the plate, and a light spring pressing the washer against the plate.

In testimony whereof I have hereunto signed my name to this specification.

ESLI A. MARSH.